Figure 1:
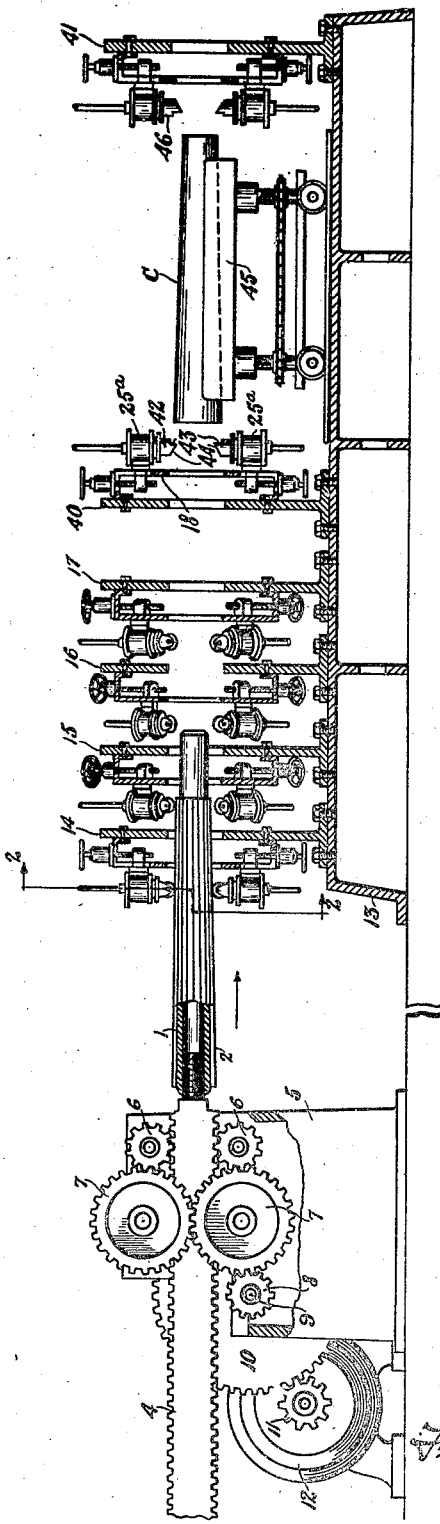

Nov. 2, 1926.

C. A. FRAHM 1,605,828

FLUTING MACHINE

Filed May 23, 1925   7 Sheets-Sheet 1

Nov. 2, 1926.

C. A. FRAHM

FLUTING MACHINE

Filed May 23, 1925

1,605,828

7 Sheets-Sheet 2

Inventor

C. A. Frahm

By Freax and Bond

Attorneys

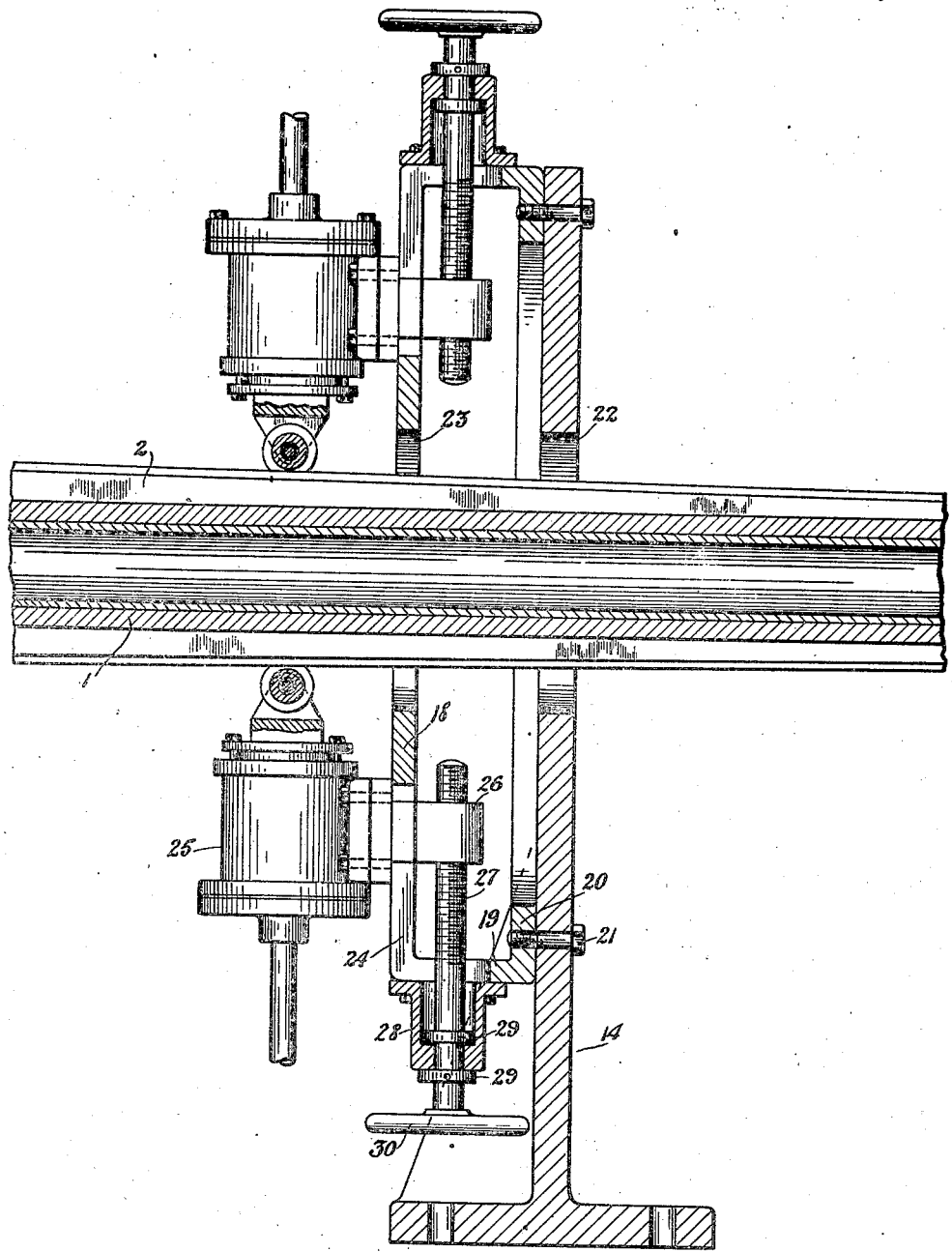

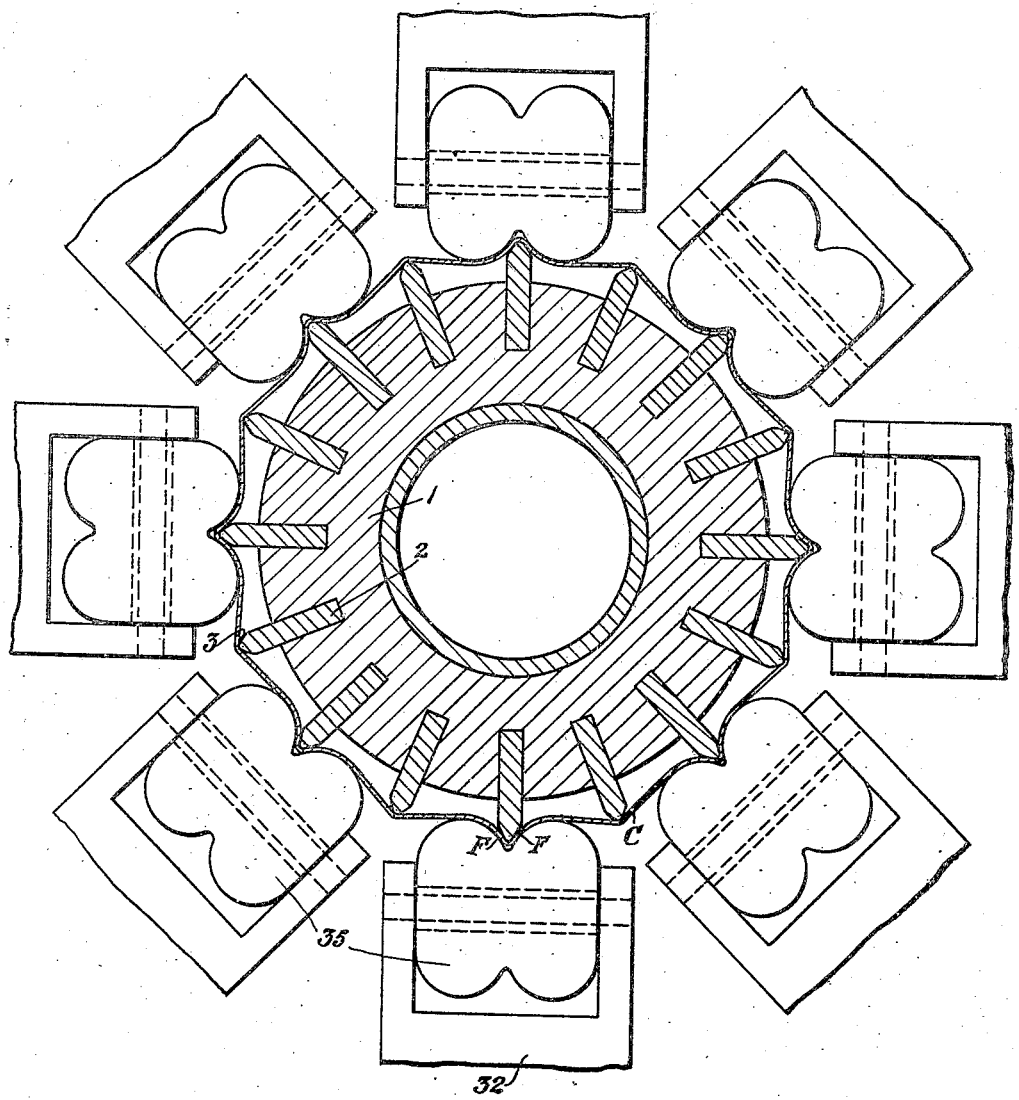

Nov. 2, 1926.

C. A. FRAHM 1,605,828

FLUTING MACHINE

Filed May 23, 1925

7 Sheets-Sheet 5

Inventor

C. A. Frahm

By Frease and Bond

Attorneys

Nov. 2, 1926.

C. A. FRAHM 1,605,828

FLUTING MACHINE

Filed May 23, 1925

7 Sheets-Sheet 6

Inventor

C. A. Frahm

By Freass and Bord

Attorneys

Patented Nov. 2, 1926.

1,605,828

UNITED STATES PATENT OFFICE.

CARL A. FRAHM, OF CANTON, OHIO, ASSIGNOR, BY MESNE ASSIGNMENTS, TO THE UNION METAL MANUFACTURING COMPANY, A CORPORATION OF OHIO.

FLUTING MACHINE.

Application filed May 23, 1925. Serial No. 32,344.

This invention relates to machines for fluting sheet metal columns, such as are used for lamp standards, building columns, trolley poles, telegraph and telephone poles, and the like.

It is well known that machines have been constructed for fluting columns formed of light gauge sheet metal, by forming the flutes one at a time over a mandrel by means of a roller, but since the mandrel can only be supported at its ends and the pressure is only applied upon one side of the mandrel, it is not practical to flute any but light gauge sheet metal columns upon such machines.

Attempts have also been made to form a plurality of flutes around a column in one operation by placing the column upon a mandrel and moving an annular head longitudinally of the mandrel, cam operated rollers being carried by the head and arranged to cooperate with the mandrel to flute the column.

Machines of this latter type also proved to be impractical as owing to the uneven wear upon the cams, it was impossible to maintain a uniform pressure upon all of the rollers throughout the entire operation, thus producing some flutes of greater depth than others.

This type of machine did not provide for a uniform pressure upon all of the rollers, throughout the entire operation, but attempted, by means of the cams, to hold the rollers against the mandrel throughout the length of the same.

As above pointed out, the rapid wear upon the cam mechanism of this machine made it impossible to form even light gauge columns of uniform contour, as all of the rollers could not be held uniformly against the mandrel throughout the operation, thus causing irregularities in the fluting of the column and making it impossible to flute a heavy gauge column upon the same.

The object of the present improvement is to provide a fluting machine for fluting tapered columns, capable of fluting columns of heavy gauge metal, and having means for applying uniform pressure upon all of the fluting rollers throughout the entire length of the mandrel.

The above objects may be attained by providing a mandrel having tapered ribs adapted to receive a tubular sheet metal column, the rollers being radially arranged around the mandrel and each roller being operated by a fluid cylinder, means being provided for applying uniform pressure to all of the cylinders throughout the operation, whereby all of the rollers engage the column with uniform pressure over the ribs of the mandrel, throughout the entire length of the mandrel.

An embodiment of the invention is illustrated in the accompanying drawings, in which—

Figure 2:
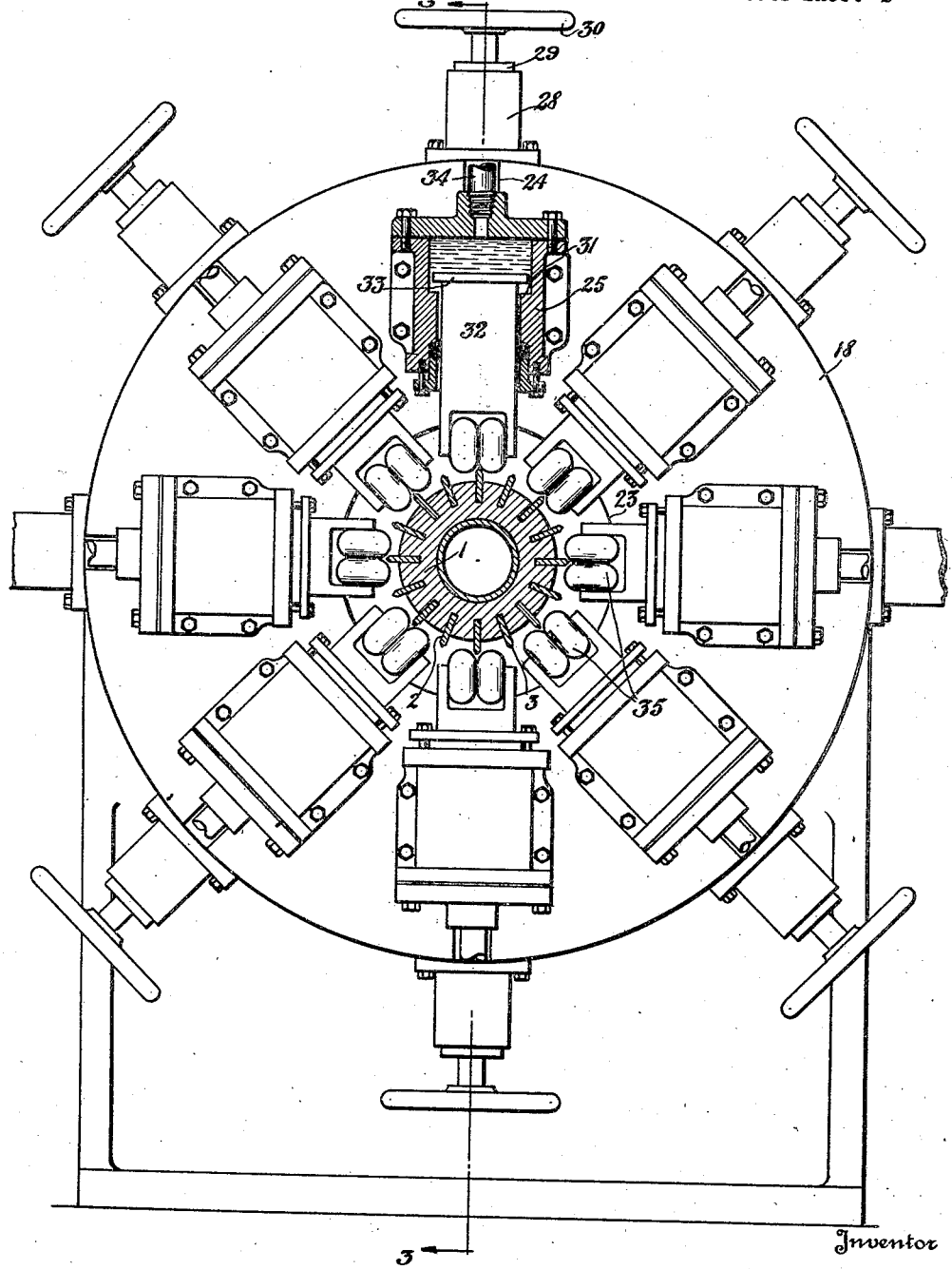
Figure 6:
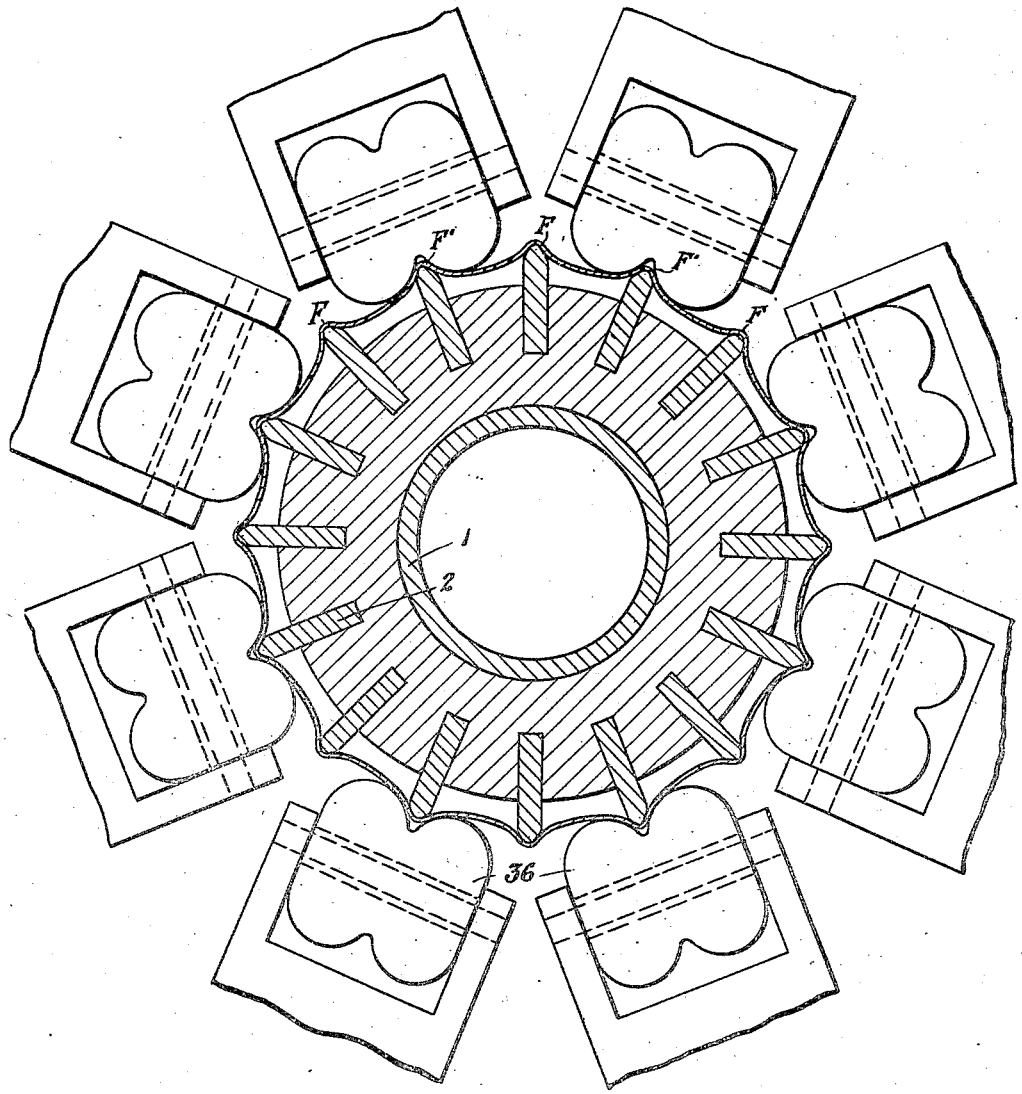
Figure 7:
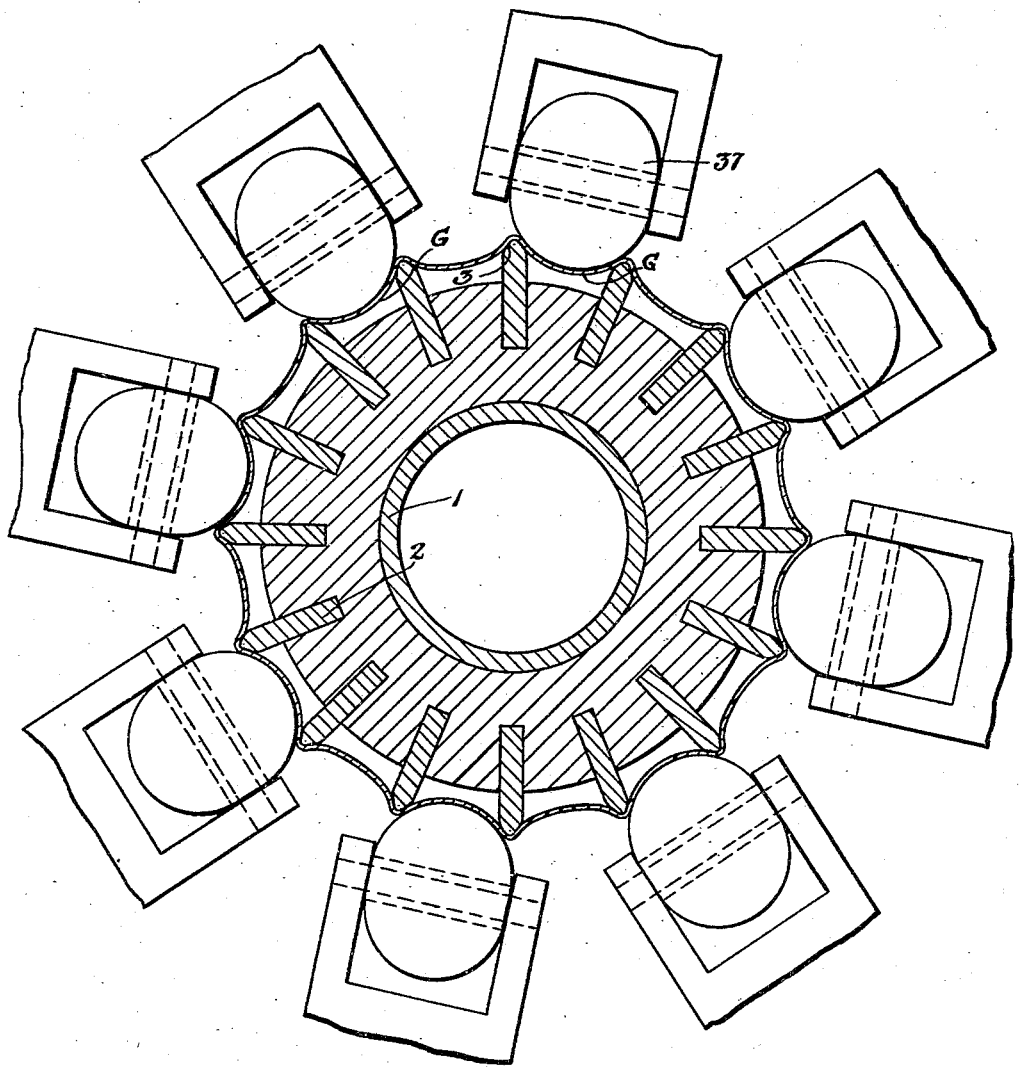
Figure 8:
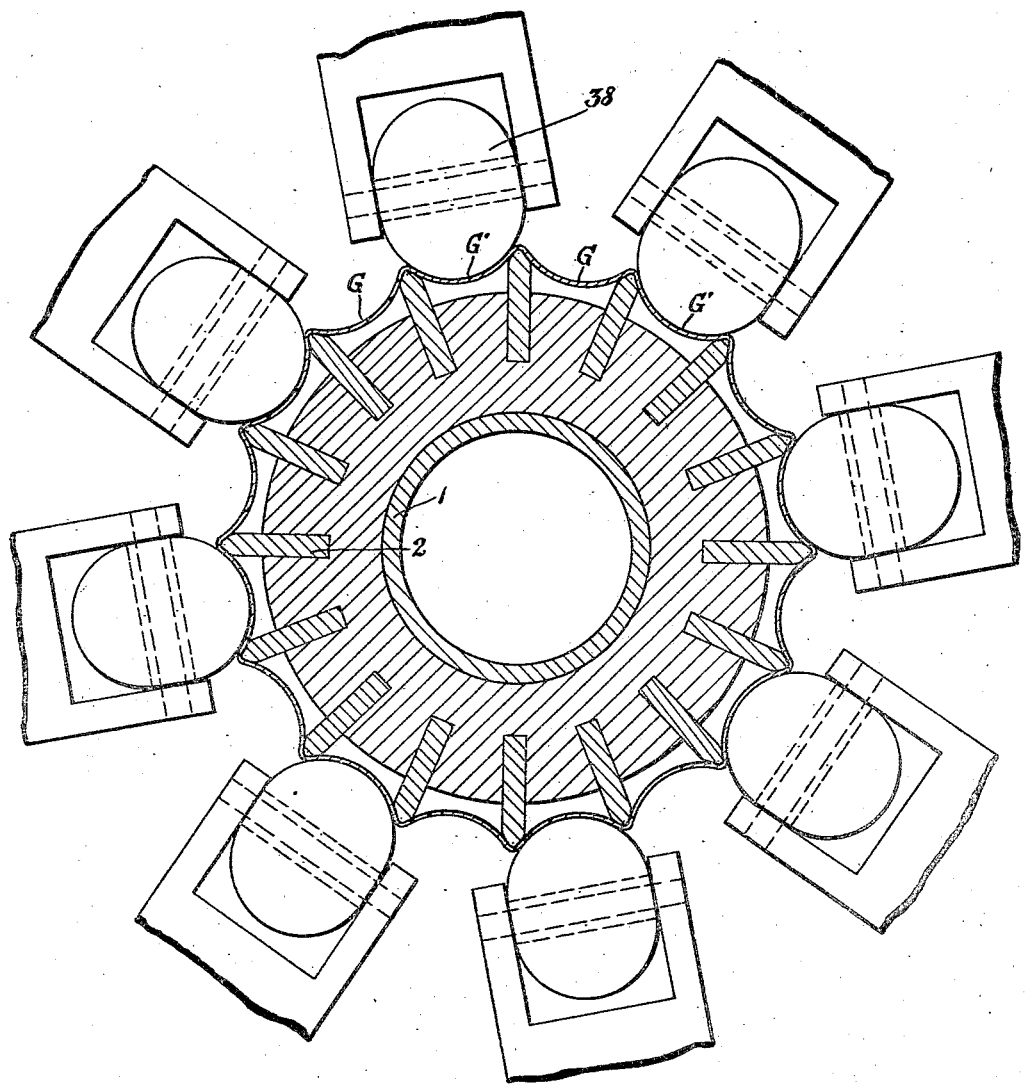

Figure 1 is a longitudinal sectional view of the improved fluting machine;

Fig. 2, an enlarged section on the line 2—2, Fig. 1;

Fig. 3, a section on the line 3—3, Fig. 2;

Fig. 4, an enlarged transverse section showing the tubular column upon the mandrel;

Fig. 5, an enlarged transverse section showing the first fillet forming operation;

Fig. 6, a similar view showing the second fillet forming operation;

Fig. 7, an enlarged transverse section showing the first flute forming operation; and Fig. 8, a similar view showing the second flute forming operation.

Similar numerals of reference indicate corresponding parts throughout the drawings.

The mandrel 1 upon which the fluting of the sheet metal column is performed, is shown as a tapered cylinder provided around its periphery with the ribs 2, preferably inserted as illustrated, having the substantially V-shaped longitudinal edges 3 to conform to the fillets to be produced in the column and spaced the desired distance apart to produce tapered flutes of the proper width in the column.

This mandrel is carried upon a double rack bar 4, horizontally slidable within the housing 5, and arranged to be driven by means of a pair of pinions 6 meshing with the rack faces of the bar.

These pinions are driven by a pair of meshing gears 7, one of which is engaged by the pinion 8 mounted upon a shaft 9 which carries the large gear 10 driven by a pinion 11 upon the shaft of the motor 12 which is a reversing type of motor in order that the mandrel may be moved horizontally in either direction.

Mounted at a distance from the mandrel stand or housing 5 and in alignment therewith is a base 13 upon which is located the mechanism for forming the fillets and tapered flutes upon a tapered sheet metal column carried by the mandrel. The mechanism for placing the sheet metal columns upon the mandrel, before the forming operations, and for stripping the fluted columns from the mandrel, may also be carried upon this base and located beyond the fillet and flute forming mechanism.

A series of spaced uprights 14, 15, 16 and 17 is mounted upon the base 13 and carries the fillet and flute forming mechanism. The initial fillet forming mechanism is carried upon the upright 14 and the final fillet forming mechanism upon the upright 15; and the initial flute forming mechanism is mounted upon the upright 16 and the final flute forming mechanism upon the upright 17.

The fillet and flute forming mechanism in each instance is carried upon a face plate removably connected to the corresponding upright and as all of these face plates and the associated mechanism, with the exception of the contours of the particular rollers, are the same, only one unit of this mechanism is illustrated in detail.

Figs. 2 and 3 show the initial fillet forming mechanism. The face plate 18 is circular and provided with a peripheral flange 19 having the in-turned rim flange 20 arranged to be connected by the screws 21 to the adjacent upright. Each upright and face plate is provided with a central aperture 22 and 23 respectively, aligned with the mandrel 1, and of sufficient size to permit free movement of the mandrel therethrough.

Each face plate is provided with spaced radial slots 24 extending into the peripheral portion thereof and a fluid cylinder 25 is provided with a lug 26 slidably located in each of said slots, an adjusting screw 27 being provided for radially adjusting each cylinder.

Each of these adjusting screws is journaled in a boss 28 fixed upon the peripheral flange of the face plate, collars 29 being provided upon each side of the boss to prevent longitudinal movement of the screw, the threaded portion thereof being located through an internally threaded bore in the adjacent lug 26, and a hand wheel 30 being provided upon the outer end of each adjusting screw, for manually operating the same.

Each of the cylinders 25 is shouldered midway of its interior forming a seat 31, and each piston 32 is provided at its inner end with a shoulder 33 arranged to seat thereon to limit the outer movement of the piston. A pipe 34 communicates with the outer end of each cylinder, said pipes being connected with a suitable source of fluid supply whereby water, oil, compressed air or other suitable fluid under pressure may be admitted to all of the cylinders on one face plate simultaneously, to uniformly operate all of the pistons upon a single face plate.

All of the cylinders upon the stands 14 and 15 are preferably connected to a single accumulator of ordinary design, and all of the cylinders upon the stands 16 and 17 may be likewise connected to a single accumulator. Thus a uniform pressure is applied to all of the fillet forming rollers throughout the length of the mandrel, and in a similar manner a uniform pressure is applied to all of the flute forming rollers throughout the entire operation.

Rollers for producing the fillets and flutes in cooperation with the madrel are carried upon the outer extremities of the pistons; the rollers 35 for the initial fillet forming operation, are of the shape shown in Figs. 2 and 4 and have a central peripheral groove arranged to coact with the adjacent V-shaped rib 3 upon the mandrel. As best shown in Fig. 4, it will be seen that these rollers are arranged to engage every alternate rib upon the mandrel, pressing the sheet metal column C over alternate ribs upon the mandrel, forming the fillets F.

The rollers 36 which form the second set of fillets, are identical with the initial forming rollers 35, and are staggered with relation thereto, so as to engage the metal over the intermediate ribs upon the mandrel, which are missed by the initial fillet forming rollers.

As shown in Fig. 6, these rollers form the fillets F' between the fillets F which are formed with the initial operation. The mechanism upon the upright 16 is provided with the rounded rollers 37, which form the flutes between alternate pairs of ribs 3, as shown in Fig. 7, pressing the metal at spaced points around the periphery of the column and forming the alternate flutes G.

As shown in Fig. 8, the final flute forming rollers 38 are similar to the rollers 37 and are spaced in staggered relation thereto, so as to engage the column between the ribs which are missed by the rollers 37, forming the flutes G' between the flutes G.

Beyond the mechanism just described, upon the base 13, is mounted an upright 40, upon which the stripping mechanism is mounted, and spaced beyond said stripping mechanism a considerable distance, and preferably mounted upon said base, is another similar upright 41, carrying a mechanism similar to the stripping mechanism, for placing the tubular sheet metal columns upon the mandrel.

The stripping mechanism is carried upon a face plate 18, similar to those above described, and provided with cylinders 25ª similar to the cylinders 25 above described, the pistons 42 thereof having the shouldered extremities 43 inclined upon the rear side as at 44.

In operation, a plain tapered sheet metal column, as indicated at C, is placed upon the carriage 45, and the motor operated to move the mandrel 1 to the right, passing the mandrel entirely through the column C. The mechanism upon the upright 41 is similar to the stripping mechanism, the pistons 46 being arranged to engage the end of the sheet metal column as the mandrel is passed through the same, forcing the column tightly upon the mandrel.

The mandrel is then withdrawn to the initial position and is again moved forward through the fillet and flute forming mechanism, the fluid being then admitted to the various cylinders to force the pistons thereof inward until the shoulders 33 thereon seat upon the seats 31, the rollers thereon forming the fillets and flutes, as shown in Figs. 5 to 8 inclusive.

It will be seen that as shown in Fig. 4, the plain tapered sheet metal column is stretched tightly over the mandrel before the forming operations take place, and as illustrated in Figs. 5 to 8, the metal is stretched and formed over the tapered ribs of the mandrel by means of the rollers, uniform pressure being applied to each set of rollers throughout the entire length of the mandrel, thus producing uniform flutes, correspondingly tapered throughout their lengths, and since extreme pressure may be applied to the rollers, by means of the fluid cylinders, it is possible to flute columns formed of heavy gauge sheet steel, upon the improved machine.

When the column is completely formed the mandrel will have reached its outward position, bringing the finished column into substantially the same position as the blank column C shown in Fig. 1. To remove the finished column from the mandrel, the pistons 42 are operated by admitting fluid to the cylinders thereof, engaging these pistons with the larger end of the column, and the mandrel is then pulled backward to the initial position, stripping the fluted column therefrom and permitting it to be removed from the machine.

I claim:

1. A fluting machine including a mandrel having tapered longitudinal ribs adapted to receive a tapered tubular column, a series of radially disposed forming rollers arranged to flute the column over said ribs, means for imparting relative movement between the mandrel and the rollers, and means for applying yielding uniform pressure to the rollers throughout the entire length of the mandrel.

2. A fluting machine including a mandrel having tapered longitudinal ribs adapted to receive a tapered tubular column, a series of radially disposed forming rollers arranged to flute the column over said ribs, means for imparting relative movement between the mandrel and the rollers, a fluid cylinder for operating each roller and means for applying yielding uniform pressure to all of said cylinders throughout the entire length of the mandrel.

3. A fluting machine including a mandrel having tapered longitudinal ribs adapted to receive a tapered tubular column, a series of radially disposed fillet forming rollers arranged to press the column over said ribs to form fillets therein, a series of radially disposed fluting rollers arranged to press and stretch the column between said ribs to form flutes therein, means for imparting relative movement between the mandrel and the rollers, and means for applying yielding uniform pressure to all the rollers in each series throughout the entire length of the mandrel.

4. A fluting machine including a mandrel having tapered longitudinal ribs adapted to receive a tapered tubular column, a series of radially disposed fillet forming rollers arranged to press the column over said ribs to form fillets therein, a series of radially disposed fluting rollers arranged to press and stretch the column between said ribs to form flutes therein, means for imparting relative movement between the mandrel and the rollers, a fluid cylinder for operating each roller and means for applying uniform pressure to all of the cylinders of each series, throughout the entire length of the mandrel.

5. A fluting machine including a mandrel having longitudinal tapered ribs adapted to receive a tapered tubular column, a series of grooved rollers arranged to press the column over said ribs to form fillets therein, a series of rollers arranged to press and stretch the column between said ribs to form flutes therein, means for imparting relative movement between the mandrel and the rollers, and means for maintaining yielding uniform pressure upon all the rollers of each series throughout the length of the mandrel.

6. A fluting machine including a mandrel having tapered longitudinal ribs adapted to receive a tapered tubular column, a series of grooved rollers arranged to press the column over said ribs to form fillets therein, a series of rollers arranged to press and stretch the column between said ribs to form flutes therein, means for moving the mandrel longitudinally, and means for maintaining yielding uniform pressure upon all the rollers of each series throughout the length of the mandrel.

7. A fluting machine including a mandrel having tapered longitudinal ribs adapted to receive a tapered tubular column, a series of grooved rollers arranged to press the column over said ribs to form fillets therein, a series of rollers arranged to press and stretch the column between said ribs to form flutes therein, means for imparting relative movement between the mandrel and the rollers, and means for applying yielding uniform pressure to all the rollers of each series throughout the length of the mandrel.

8. A fluting machine including a mandrel having tapered longitudinal ribs adapted to receive a tapered tubular column, a series of grooved rollers arranged to press the column over certain of said ribs to form fillets therein, a second series of grooved rollers arranged to press the column over the remaining ribs to form additional fillets therein, a series of rounded rollers arranged to press and stretch the column between certain of said ribs to form flutes therein, a second series of rounded rollers arranged to press and stretch the column between the remaining ribs to form additional flutes therein, means for imparting relative movement between the mandrel and the rollers, and means for applying uniform pressure to all the rollers of each series, throughout the length of the mandrel.

9. A fluting machine including a mandrel having tapered longitudinal ribs adapted to receive a tapered tubular column, a series of grooved rollers arranged to press the column over alternate ribs to form fillets therein, a second series of grooved rollers arranged to press the column over the remaining ribs to form additional fillets therein, a series of rounded rollers arranged to press and stretch the column between alternate pairs of ribs to form flutes therein, a second series of rounded rollers arranged to press and stretch the column between the remaining pairs of ribs to form additional flutes therein, means for imparting relative movement between the mandrel and the rollers, and independent means for applying uniform pressure to all of the fillet forming rollers, and uniform pressure to all of the flute forming rollers throughout the length of the mandrel.

10. In a fluting machine of the character described in claim 1, a fluid cylinder operatively connected to each roller, and means for uniformly admitting fluid to each cylinder.

11. A fluting machine including a longitudinally movable mandrel having tapered longitudinal ribs adapted to receive a tapered tubular column, a plurality of uprights mounted in alinement with the mandrel, face plates mounted upon said uprights, said uprights and face plates having central openings to receive the mandrel, fluid cylinders carried by said face plates, grooved rollers carried by one set of cylinders to press the column over the ribs to form fillets therein, rollers carried by one set of cylinders to stretch the column between the ribs to form flutes therein, and means for uniformly admitting fluid to each cylinder of a series.

12. A fluting machine including a longitudinally movable mandrel having tapered longitudinal ribs adapted to receive a tapered tubular column, a plurality of uprights mounted in alinement with the mandrel, face plates mounted upon said uprights, said uprights and face plates having central openings to receive the mandrel, fluid cylinders carried by said face plates, grooved rollers carried by one set of cylinders to press the column over the ribs to form fillets therein, rollers carried by one set of cylinders to stretch the column between the ribs to form flutes therein, pistons in one set of cylinders for stripping the column from the mandrel, and means for uniformly admitting fluid to each cylinder of a series.

13. A fluting machine including a longitudinally movable mandrel having tapered longitudinal ribs adapted to receive a tapered tubular column, a plurality of uprights mounted in alinement with the mandrel, face plates mounted upon said uprights, said uprights and face plates having central openings to receive the mandrel, fluid cylinders carried by said face plates, grooved rollers carried by one set of cylinders to press the column over the ribs to form fillets therein, rollers carried by one set of cylinders to stretch the column between the ribs to form flutes therein, pistons in one set of cylinders for forcing the column upon the mandrel, and means for uniformly admitting fluid to each cylinder of a series.

14. A fluting machine including a longitudinally movable mandrel having tapered longitudinal ribs adapted to receive a tapered tubular column, a plurality of uprights mounted in alinement with the mandrel, face plates mounted upon said uprights, said uprights and face plates having central openings to receive the mandrel, fluid cylinders carried by said face plates, grooved rollers carried by one set of cylinders to press the column over the ribs to form fillets therein, rollers carried by one set of cylinders to stretch the column between the ribs to form flutes therein, pistons in one set of cylinders for forcing the column upon the mandrel, pistons in one set of cylinders for stripping the column from the mandrel, and means for uniformly admitting fluid to all of the cylinders of a series.

15. A fluting machine including a mandrel having tapered longitudinal ribs adapted to receive a tapered tubular column, a series of radially disposed forming rollers arranged to flute the column over said ribs, means for imparting relative movement between the mandrel and the rollers and a fluid cylinder for operating each roller, all of said cylinders being connected to a single accumulator whereby a yielding uniform pressure is applied to all of the rollers throughout the length of the mandrel.

In testimony that I claim the above, I have hereunto subscribed my name.

CARL A. FRAHM.